United States Patent
Rowe

(10) Patent No.: US 11,543,010 B2
(45) Date of Patent: Jan. 3, 2023

(54) METAL MATRIX COMPOSITE AUTOMOTIVE GEARS

(71) Applicant: Toyota Motor Engineering & Manufacturing North America, Inc., Plano, TX (US)

(72) Inventor: Michael Paul Rowe, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 196 days.

(21) Appl. No.: 16/874,187

(22) Filed: May 14, 2020

(65) Prior Publication Data

US 2021/0356030 A1  Nov. 18, 2021

(51) Int. Cl.
| | | |
|---|---|---|
| F16H 55/06 | (2006.01) | |
| B22F 5/08 | (2006.01) | |
| B22F 3/24 | (2006.01) | |
| B22F 9/16 | (2006.01) | |

(52) U.S. Cl.
CPC ............ *F16H 55/06* (2013.01); *B22F 3/24* (2013.01); *B22F 5/08* (2013.01); *B22F 9/16* (2013.01); *B22F 2003/247* (2013.01); *B22F 2301/35* (2013.01)

(58) Field of Classification Search
None
See application file for complete search history.

(56) References Cited

U.S. PATENT DOCUMENTS

| | | |
|---|---|---|
| 5,814,408 A | 9/1998 | Ting et al. |
| 10,364,753 B2 | 7/2019 | Madge |
| 2006/0021729 A1* | 2/2006 | Werner .................. C22C 47/06 164/98 |
| 2018/0079884 A1 | 3/2018 | Rowe |

FOREIGN PATENT DOCUMENTS

CN  101314839 B  4/2010

OTHER PUBLICATIONS

Shirvanimoghaddam, K. et al., "Carbon fiber reinforced metal matrix composites: Fabrication processes and properties", Composites: Part A 92, pp. 70-96 (2017).
Adebisi, A., et al., "Metal Matrix Composite Brake Rotors: Historical Development and Product Life Cycle Analysis," International Journal of Automotive and Mechanical Engineering, 4, pp. 471-480 (2011).

(Continued)

*Primary Examiner* — Anthony M Liang
(74) *Attorney, Agent, or Firm* — Christopher G. Darrow; Darrow Mustafa PC

(57) ABSTRACT

Carbon fiber reinforced metal matrix composite gears include a planar carbon fiber structure fully encapsulated within a metal matrix formed of sintered metal nanoparticles. The metal nanoparticles can be composed of a metal having a high sintering temperature that would ordinarily destroy the carbon fiber. Novel techniques for making small uniform nanoparticles for sintering lowers the sintering temperature to a level that can accommodate carbon fiber. The composite gears possess high strength to weight ratio.

9 Claims, 4 Drawing Sheets

(56) References Cited

OTHER PUBLICATIONS

Miracle, D.B., "Metal matrix composites—From science to technological significance," Composites Science and Technology, 65, pp. 2526-2540 (2005).
Ceschini, L., "Aluminum and Magnesium Metal Matrix Nanocomposites," ISBN 978-981-10-2681-2 (2017).
Embury, D. et al., "Steel-Based Composites: Driving Forces and Classifications," Annu. Rev. Mater. Res., 40, pp. 213-241 (2010).
Mortensen, A. et al., "Metal Matrix Composites," Annu. Rev. Mater. Res., 40, pp. 243-270 (2010).

* cited by examiner

METAL MATRIX COMPOSITE AUTOMOTIVE GEARS

TECHNICAL FIELD

The present disclosure generally relates to composite automotive gears and, more particularly, to gears formed of carbon fiber reinforced metal matrix composites.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Reduction in the weight of automotive vehicles has the potential to improve performance, including fuel efficiency and acceleration. It is partly for this reason that plastics and aluminum have replaced steel and other heavy materials in areas such as bumpers, cabin materials, and even in the engine compartment. It is of course important that such weight diminishing substitutions can be made while maintaining structural integrity and durability.

Transmission gears for automotive vehicles are typically formed of bulk metal, most commonly, steel. Because of this, gears typically have the density of iron, and a transmission can weigh from nearly 200 pounds to nearly 300 pounds. An automotive transmission, equipped with gears of lower density but undiminished or even improved physical robustness, thus provides an opportunity for vehicle weight diminishment and the attendant benefits.

Automotive gears of course are exposed to considerable strains for long durations, and must possess considerable tensile strength, ultimate strength, and so forth. Depending on the gear composition (e.g. S45C carbon steel vs. SCM440 chrome/molybdenum steel) and heat treatment during manufacture (e.g. thermal refining vs. induction hardening), the hardness of the bulk metal from which an automotive gear is formed can vary, but rarely exceeds a tensile strength of about 880 $N/mm^2$. Titanium alloys could potentially provide tensile strength as high as about 1100 $N/mm^2$ with a 40% weight reduction, but would incur substantial cost increase.

Accordingly, it would be desirable to provide automotive gears formed of metal matrix composites having lower density and equal or greater strength compared to the base metals themselves.

SUMMARY

This section provides a general summary of the disclosure, and is not a comprehensive disclosure of its full scope or all of its features.

In various aspects, the present teachings provide a composite transmission gear. The composite gear includes a continuous metal matrix formed of sintered metal nanoparticles and at least one carbon fiber structure fully encapsulated within the continuous metal matrix. The metal or metal alloys that compose the nanoparticles have a melting temperature greater than about 1500° C. in bulk form, and the continuous metal matrix includes a body portion defining an axis of rotation, and a tooth portion having gear teeth arrayed around the body portion. The gear teeth are configured to engage another gear.

In other aspects, the present teachings provide a transmission gear for an automotive vehicle. The gear includes a continuous metal matrix of sintered metal nanoparticles, and at least one reinforcing carbon fiber that is encapsulated within the continuous metal matrix. The metal nanoparticles are composed of a metal selected from the group consisting of steel and titanium.

In still other aspects, the present teachings provide a method for forming a composite gear. The method includes a step of providing steel nanoparticles. The method further includes a step of combining the steel nanoparticles with a reinforcing carbon fiber component, in a die corresponding to a desired gear shape, to produce an unannealed combination having the desired gear shape. The method further includes a step of sintering the steel nanoparticles to produce the composite gear.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present disclosure generally relates to transmission gears formed of metal matrix composites reinforced with carbon fiber. In some instances, the gears can be transmission gears for automotive vehicles. The gears can have improved strength-to-weight ratios in comparison to conventional automotive gears, which are conventionally formed of unreinforced steel.

Disclosed gears are formed of a continuous metal matrix forming both body (wheel) and tooth portions. The continuous metal matrix is formed of sintered metal nanoparticles. One or more carbon fiber substrates, such as carbon fiber weave, are completely embedded within the body portion, tooth portion, both portions, or parts of both portions. The continuous metal matrix is typically formed of a high temperature metal, particularly steel. Gears of the present teachings are formed through a specialized sintering/powder metallurgy approach. Conventionally available steel powder sinters at temperatures of greater than about 1100-1300° C. Such a high temperature would destroy the carbon fiber in the presence of air or oxygen, and the density difference between carbon fiber and steel would prevent penetration of the metal matrix into the carbon fiber due to buoyancy. The present technology for forming a steel/polymer composite employs steel nanoparticles, lowering the sintering temperature of steel to less than about 450° C. When combined and heated, this allows for the steel nanoparticles to sinter around the reinforcing carbon fiber component, without destroying the reinforcing carbon fiber component. The result is layer(s) of a reinforcing carbon fiber interpenetrated in a steel matrix.

A composite of the present disclosure can have significantly lower density than conventional steel, as low as 60% in one example. The composite can also provide considerable structural strength, including tensile strength.

Figure 1A:
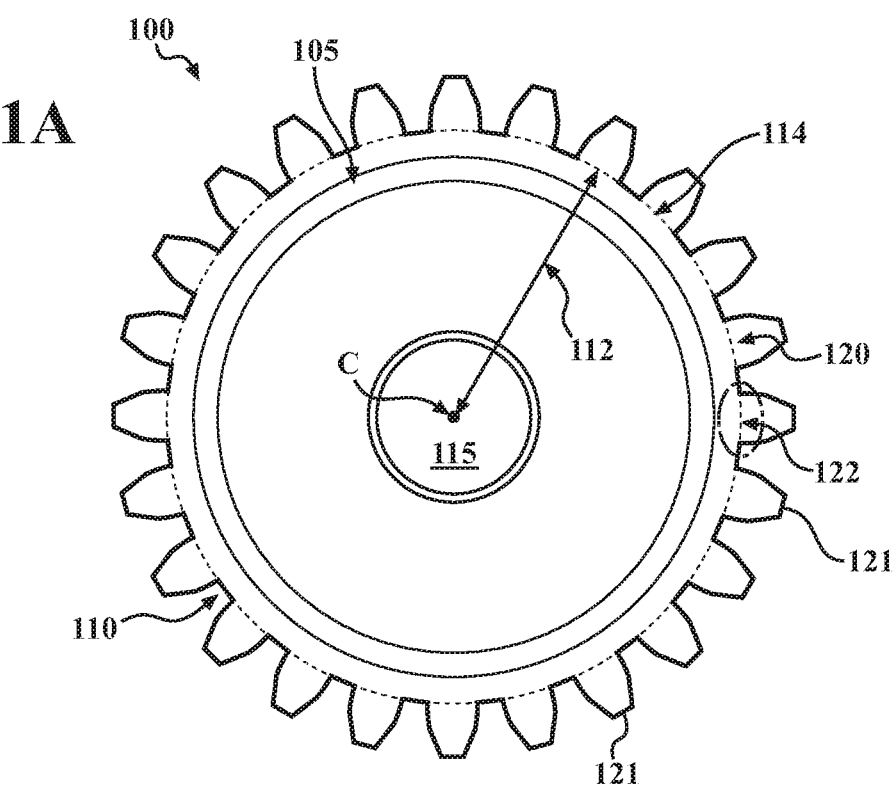
FIG. 1A is a plan view of an exemplary gear of the present teachings.
Figure 1B:
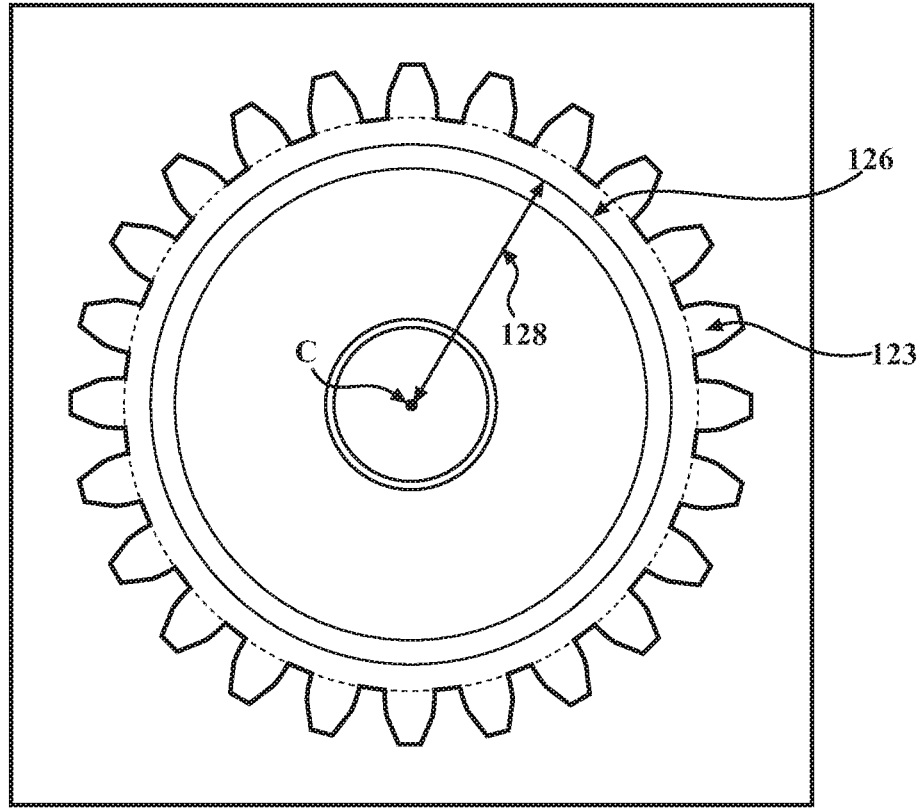
FIG. 1B is a plan view of the gear 100 of FIG. 1A, with additional geometric references.
Figure 1C:
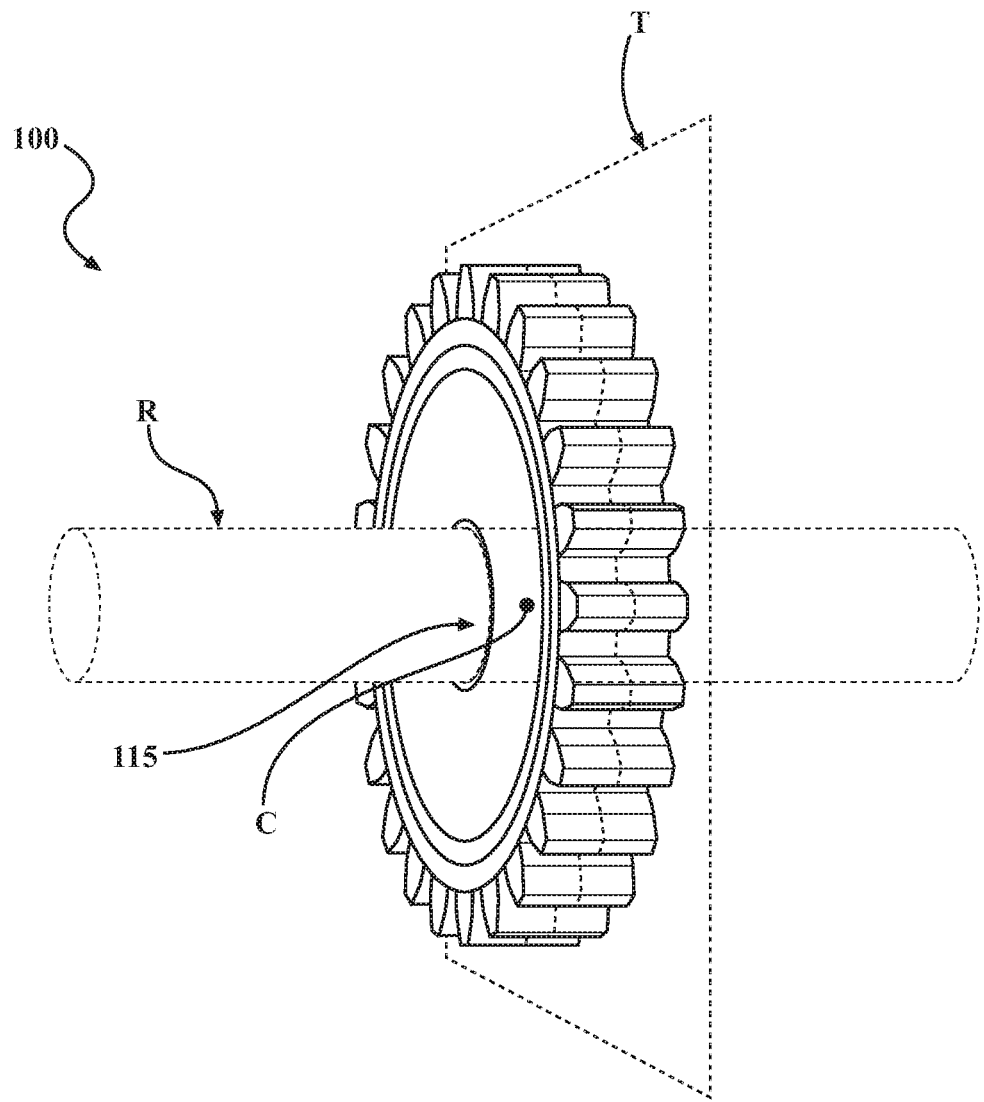
FIG. 1C is a perspective view of the gear 100 of FIGS. 1A and 1B.

FIG. 1A shows a plan view of an exemplary gear 100 of the present teachings. FIG. 1B shows a plan view of the gear 100 of FIG. 1A, with geometric references added, and FIG. 1C shows a perspective view of the gear 100 of FIGS. 1A and 1B. With reference to FIGS. 1A-1C, a carbon fiber reinforced metal matrix composite (CF-MMC) gear 100 has a body portion 105 and a tooth portion 120 composed of individual gear teeth 121. Each tooth 121 has a root 122, the region in which the tooth 121 merges with the body portion 105. The body portion 105 is defined by an inner circle having a root radius 112 and a root circumference 114, positioned about a center, C. The gear 100 has an axis of rotation, R, that passes through the center, C. The gear 100 can be considered to have a transverse plane, T, orthogonal to the axis of rotation, R, and passing through the center, C. The center, C, can be surrounded by a central aperture 115, configured to engage an axle, rod, or other connecting structure. In general, such an axle, rod, or other connecting structure, when engaged to the central aperture 115, will be positioned congruent with (i.e. parallel to, and fully overlapping with) the axis of rotation. In variations, the gear 100 can further include a reinforcement region 123 that includes the tooth portion 120 and an outer concentric circle of the body portion 105. The reinforcement region 123 is bounded by a reinforcement circumference 126 that is concentric to the root circumference 114, and has a reinforcement radius 128. In many implementations, the reinforcement radius 128 can differ from the root radius 112. In certain implementations, the reinforcement radius 128 can be within a range of 0.8 to 0.95 times the root radius 112.

It should be understood that, in some implementations, a gear 100 of the present teachings can include a gear rack, i.e. a linear or curvilinear structure having a linear or curvilinear body portion and a tooth portion arrayed along the body portion. It will be understood that such implementations would not have the center and radial geometric features described above.

Figure 2A:
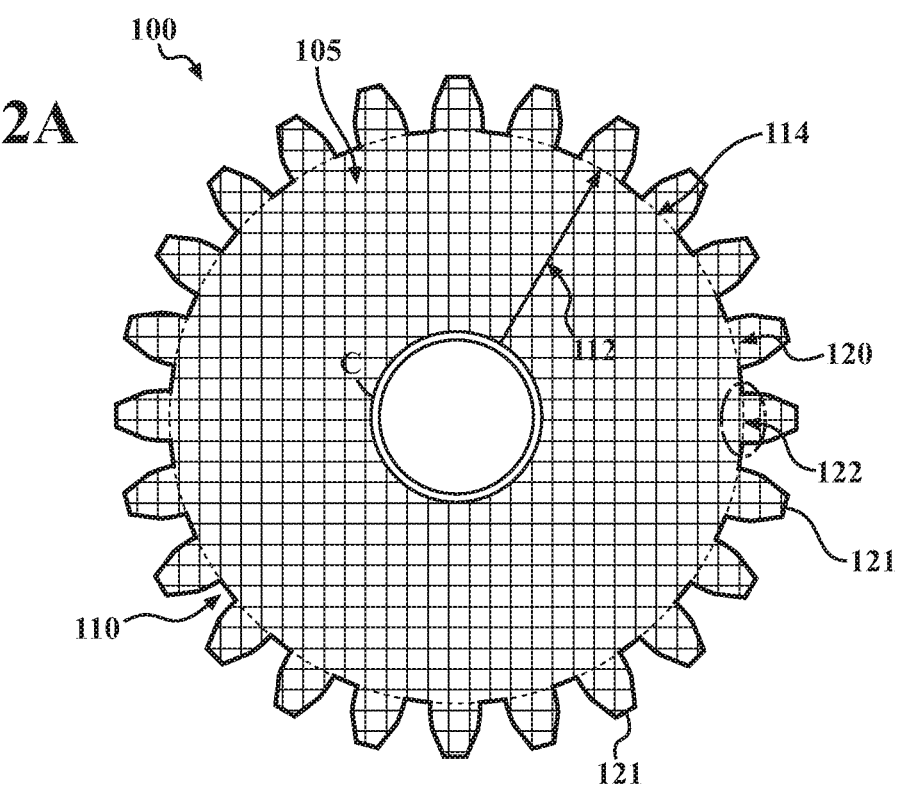
FIG. 2A is a plan view of the gear of FIGS. 1A-1C illustrating its internal composition.

FIG. 2A shows a plan view of the gear of FIGS. 1A-1C illustrating its internal composition. With reference to FIG. 2A, the gear 100 can be formed of a CF-MMC having a metal matrix 200 reinforced with at least one carbon fiber structure 220. The at least one carbon fiber structure 220 (alternatively referred to, for simplicity, merely as "the carbon fiber structure 220") can be a flexible, planar, two-dimensional structure of multiple carbon fibers, such as a carbon fiber mesh, weave, or fabric.

Figure 2B:
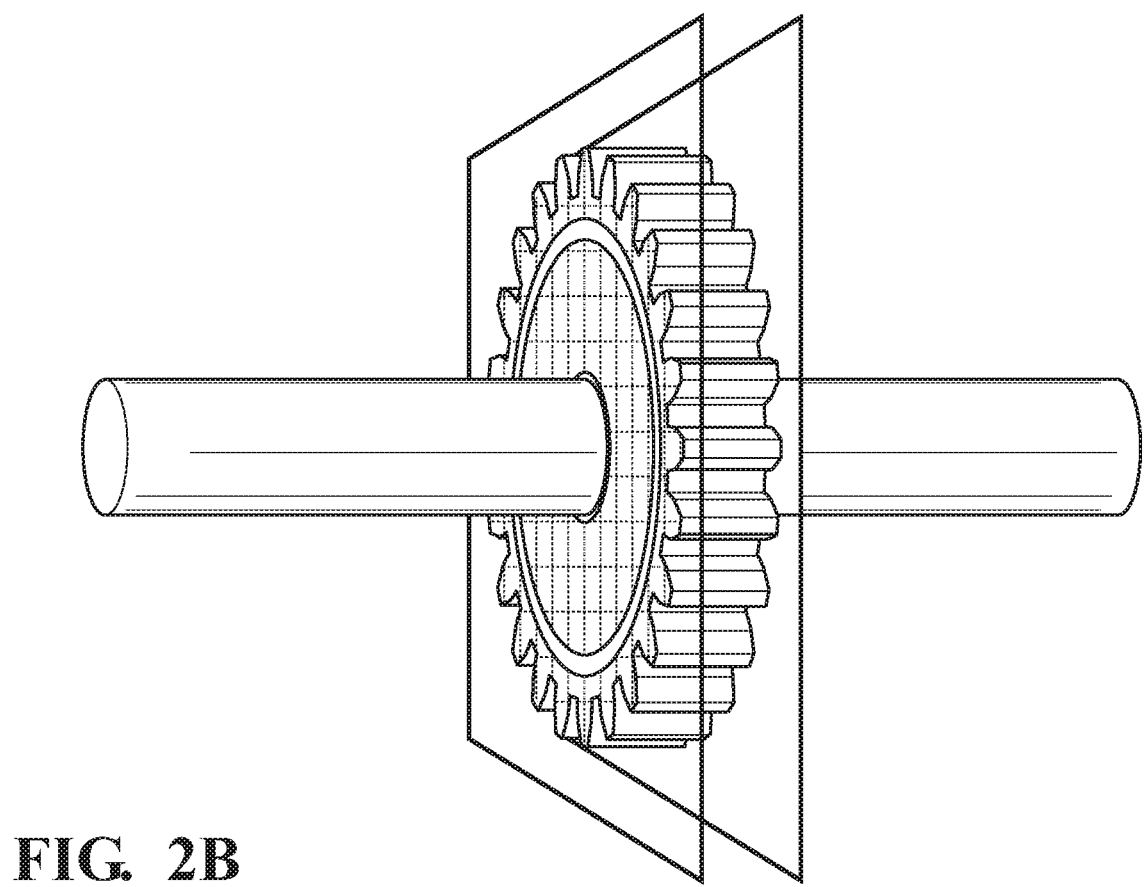
FIG. 2B is a perspective view of the gear 100 of FIG. 2A, with continued illustration of its internal composition.

FIG. 2B shows a perspective view of the gear 100 of FIG. 2A, with continued illustration of its internal composition. In the example of FIG. 2B, the gear 100 includes a first carbon fiber structure 220A contained within the transverse plane, T. The gear of FIG. 2B includes second and third carbon fiber structures 220B, 220C parallel to, and spaced apart from, the transverse plane.

In some implementations the planar carbon fiber structure 220 can be parallel to the transverse plane, T, orthogonal to the axis of rotation, R, of the gear 100. In some such implementations, the planar carbon fiber structure 220 can be within the transverse plane, T. In many such implementations, the carbon fiber structure 220 can extend through the entirety of the gear 100. This means that the carbon fiber structure 220 extends through the entire body portion 105 and tooth portion 120, and that the planar outline of carbon fiber structure 220 is substantially identical to the outline of the gear 100 in the occupied plane (i.e. the transverse plane, T, or other plane that is parallel to the transverse plane).

In some implementations, the at least one carbon fiber structure occupies only the tooth portion 120. In some implementations, the at least one carbon fiber structure specifically occupies the reinforcement region 123.

The continuous metal matrix 110 is generally formed of sintered nanoparticles of a metal having a melting temperature greater than about 1500° C. when the metal is in the bulk. Exemplary metals include, without limitation, steel and titanium. It will be understood that such metals have a typical sintering temperature that would destroy carbon fiber, and that special measures, including formation of small size and regular distribution nanoparticles, must be taken to lower the sintering temperature to a level that will accommodate carbon fiber. In variations where the metal matrix 110 is formed of steel, it can optionally include any, several, or all, of: manganese, nickel, chromium, molybdenum, boron, titanium, vanadium, tungsten, cobalt, niobium, phosphorus, sulfur, and silicon. Relative ratios of the various elemental components of the steel matrix 110 can depend on the desired application, and will generally be selectable based on common knowledge to one of skill in the art. For example, an application requiring stainless steel can include chromium present at greater than or equal to 11%, by weight, of the total weight. In one disclosed Example, the steel matrix consists of iron, carbon, and manganese present at 99.08%, 0.17%, and 0.75%, respectively, by weight of the steel matrix. It will be understood that the term "weight" as used here is interchangeable with the term "mass".

In some implementations, the term "continuous", as used in the phrase, "continuous metal matrix 110" can mean that the metal matrix is formed as, or is present as, a unitary, integral body. In such implementations, and as a negative example, a structure formed of two distinct metal bodies held together such as with an adhesive or with a weld would be discontinuous. In some implementations, the term "continuous" as used herein can mean that a continuous steel matrix 110 is substantially compositionally and structurally homogeneous throughout its occupied volume. For simplicity, the continuous metal matrix 110 will be alternatively referred to herein as "metal matrix 110", i.e. the word "continuous" will at times be omitted without changing the meaning.

The description that the at least one carbon fiber structure 220 is "encapsulated within the continuous metal matrix 110" can mean that at least a portion of individual fibers comprising the at least one reinforcing carbon fiber structure 220 are contactingly surrounded by the continuous metal matrix 110. In some implementations, the expression, "fully encapsulated within the continuous metal matrix 110" can mean that the continuous metal matrix 110 is, partially or fully formed around or otherwise contactingly disposed around the at least one reinforcing carbon fiber structure 220.

In certain implementations, a gear 100 of the present teachings can be incorporated in a transmission of an automotive vehicle. The vehicles useful with the present technology may take any one of several different forms. In various examples, the vehicles are shown to be passenger automobiles. However, it should be understood that the vehicles and groups of vehicles may include other types of vehicles, such as trucks, commercial vehicles, sport utility vehicles, heavy-duty trucks, emergency vehicles, mining vehicles, agricultural vehicles, military vehicles, landscaping vehicles, construction vehicles, single passenger vehicles such as motorized bikes, and the like. Moreover, the vehicles could be any type of vehicle that is capable of transporting persons and/or objects from one location to another. Furthermore, it should be understood that the vehicles may not be limited to land-based vehicles but could also include other types of vehicles as well, such as boats and vessels docked in a harbor, and aircrafts parked in a hanger.

Figure 3:
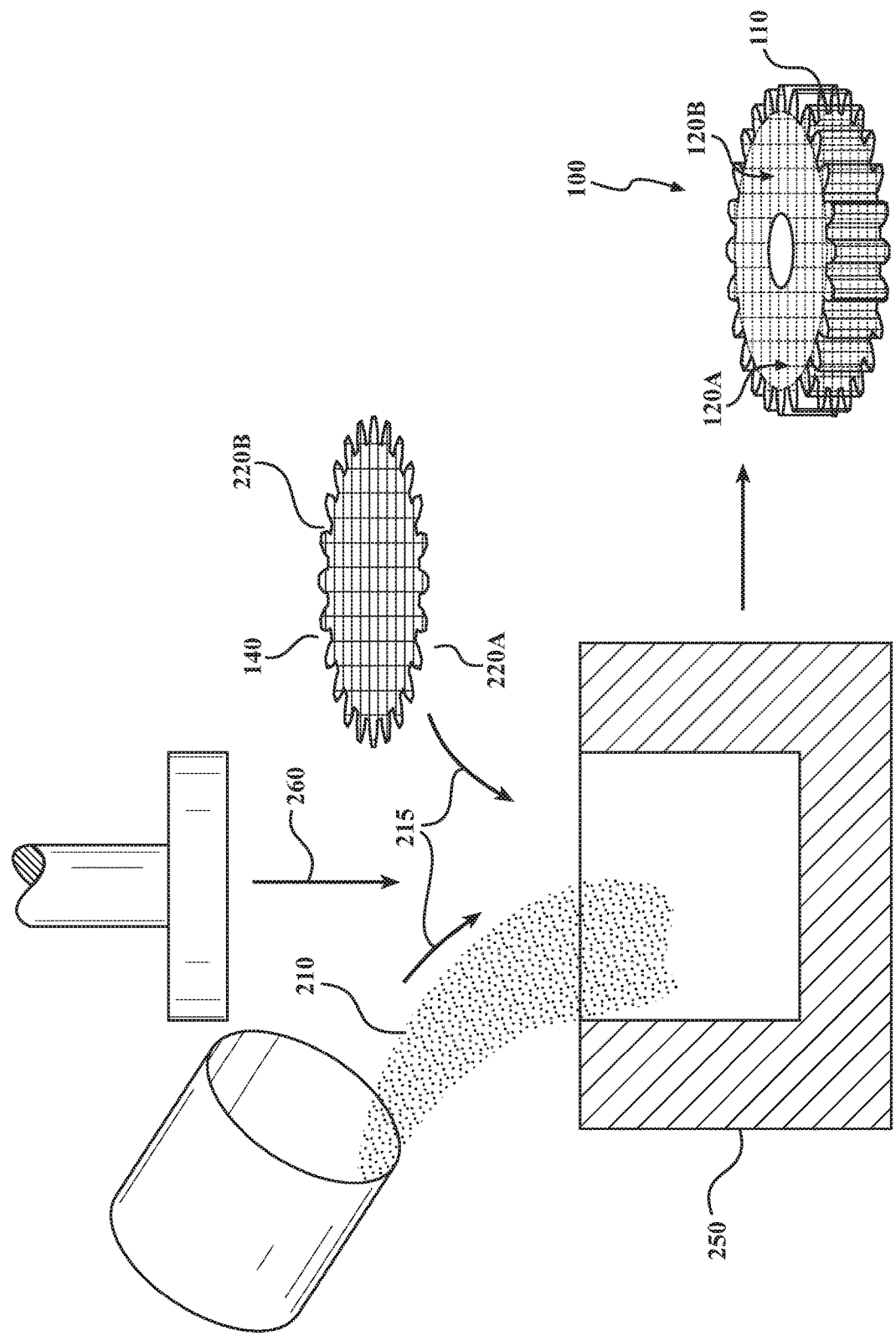
FIG. 3 shows a schematic representation of a method for forming a gear composed of a carbon fiber reinforced metal matrix composite.

Also disclosed is a method for forming a gear 100 composed of CF-MMC. FIG. 3 shows a schematic representation of the disclosed method. With reference to FIG. 3, the method includes a step of providing metal nanoparticles 310. The term "metal nanoparticles 310" refers generally to a sample consisting predominantly of particles of steel having an average maximum crystallite dimension less than about 300 nm. Individual particles of the metal nanoparticles 310 will generally consist of any alloy as compositionally described above with respect to the metal matrix 110 of the CF-MMC.

With continued reference to FIG. 3, the method for forming a composite gear 100 additionally includes a step of combining 215 the metal nanoparticles 310 with a reinforcing carbon fiber component 320 to produce an unannealed combination. The reinforcing carbon fiber component 320 is in all respects identical to the reinforcing carbon fiber structure 120 as described above with respect to the gear 100, with the exception that the reinforcing carbon fiber component 320 is not yet integrated into, or encapsulated within, a continuous metal matrix 110 as defined above. Thus, the reinforcing carbon fiber component 320 can include, for example, carbon fibers formed in any configuration designed to impart tensile strength in at least one dimension, in some aspects in at least two-dimensions.

In many implementations, the combining step 215 will include sequentially combining at least one layer of metal nanoparticles 310 and at least one layer of reinforcing carbon fiber component 320, such that the unannealed combination consists of one or more layers each of metal nanoparticles 310 and reinforcing carbon fiber component 320. Any number of layers of metal nanoparticles 310 and any number of layers of reinforcing carbon fiber component 320 can be employed.

The combining step 215 will generally include combining the metal nanoparticles 310 and the reinforcing carbon fiber component 320 within a die, cast, or mold corresponding to the shape of the gear 100 to be formed, i.e. to the desired gear shape. In some particular implementations, the at least one layer of metal nanoparticles 310 and the at least one layer of reinforcing carbon fiber component 320 will be combined within a heat press die 250.

In some implementations, the method for forming a gear 100 can include a step of manipulating metal nanoparticles 310 in the unannealed combination into interstices in the reinforcing carbon fiber component 320. Such a manipulating step can be effective to maximize surface area of contact between metal nanoparticles 310 and the reinforcing carbon fiber component 320 in the unannealed combination, improving the effectiveness of integration of the reinforcing carbon fiber structure 220 into the continuous matrix 110 of the eventually formed gear 100. Manipulating metal nanoparticles 310 into interstices in the reinforcing carbon fiber component 320 can be accomplished by any procedure effective to increase surface area of contact between metal nanoparticles 310 and reinforcing carbon fiber component 320, including without limitation: pressing, agitating, shaking, vibrating, sonicating, or any other suitable procedure.

The method for forming a composite gear 100 additionally includes a step of sintering the metal nanoparticles 310, thereby converting the metal nanoparticles 310 into a continuous metal matrix 110 such that the reinforcing carbon fiber component 320 becomes a reinforcing carbon fiber structure 220 integrated into the continuous metal matrix 110; and thus converting the unannealed combination into a fully formed composite gear 100. The sintering step generally includes heating the unannealed combination to a temperature within the thermal stability range of carbon fiber and sufficiently high to sinter the metal nanoparticles 310. In some implementations, the sintering step can include heating the unannealed combination to a temperature greater than 400° C. and less than 1500° C. In some implementations, the sintering step can include heating the unannealed combination to a temperature greater than 420° C. and less than about 1000° C.

In some implementations, the sintering step can be achieved by hot compaction, i.e. by applying elevated pressure 260 simultaneous to the application of elevated temperature. In some implementations employing hot compaction, the elevated pressure can be at least 30 MPa; and in some implementations, the elevated pressure can be at least 60 MPa. Depending on the sintering conditions of temperature and pressure, the duration of the sintering step can vary. In some implementations, the sintering step can be performed for a duration within a range of 2-10 hours, and in one disclosed Example is performed for a duration of 4 hours.

It will be appreciated that in some instances, providing metal nanoparticles 310 having a desired composition, average maximum dimension, and/or relative standard deviation of the average maximum dimension may be difficult to achieve by conventional methods. For example, "top down" approaches involving fragmentation of bulk metal into particulate metal via milling, arc detonation, or other known procedures will often provide metal particles that are too large and/or too heterogeneous for effective sintering into a uniform, robust continuous metal matrix 110. This is particularly true for metals that are particularly hard and/or dense, such as steel or titanium. "Bottom up" approaches, such as those involving chemical reduction of dissolved cations, will often be unsuitable for various alloy nanoparticles due to incompatible solubilities, or even unavailability, of the relevant cations. For example, cationic carbon, that is suitable for chemical co-reduction with cationic iron to form steel, may be difficult to obtain. Further, even where these techniques or others may be effective to produce metal nanoparticles 310 of a given composition at laboratory scale, scale up may prove unfeasible or uneconomical.

For these reasons, the step of providing metal nanoparticles 310 can in many implementations be performed by a novel metal nanoparticle 310 synthesis using Anionic Element Reagent Complexes (AERCs). An AERC generally is a reagent consisting of one or more elements in complex with a hydride molecule, and having a formula:

$$Q^0 \cdot X_y \qquad \text{Formula I,}$$

wherein $Q^0$ represents a combination of one or more elements, each formally in oxidation state zero and not necessarily in equimolar ratio relative to one another; X represents a hydride molecule, and y is an integral or fractional value greater than zero. An AERC of Formula I can be formed by ball-milling a mixture that includes: (i) powders of each of the one or more elements of the desired metal(s), present at the desired molar ratios; and (ii) a powder of the hydride molecule, present at a molar ratio relative to the combined one or more elements that corresponds to y. In many implementations, the hydride molecule will be a borohydride, and in some specific implementations the hydride molecule will be lithium borohydride.

Contacting an AERC of Formula I with a suitable solvent and/or ligand molecule will result in formation of nanoparticles consisting essentially of the one or more elements, the one or more elements being present in the nanoparticles at ratios equivalent to which they are present in the AERC.

Thus, an AERC suitable for use in metal nanoparticle 310 synthesis, where the metal is steel as an example, generally has a formula:

$$Fe_a C_b M_d X_y \qquad \text{Formula II,}$$

where Fe is elemental iron, formally in oxidation state zero; C is elemental carbon, formally in oxidation state zero; M represents one or more elements in oxidation state zero, each of the one or more elements selected from a group including Mn, Ni, Cr, Mo, B, Ti, V, W, Co, Nb, P, S, and Si; X is a hydride molecule as defined with respect to Formula I; a is a fractional or integral value greater than zero; b is a fractional or integral value greater than zero; d is a fractional or integral value greater than or equal to zero; and y is a fractional or integral value greater than or equal to zero. It will be appreciated that the values of a, b, and c will generally correspond to the molar ratios of the various components in the desired composition of steel. It is further to be understood that M and d are shown as singular values for simplicity only, and can correspond to multiple elements present at non-equimolar quantities relative to one another. An AERC of Formula II can alternatively be referred to as a steel-AERC.

Formation of a steel-AERC can be accomplished by ball-milling a mixture that includes: (I) a powder of a hydride molecule, such as lithium borohydride; and (II) a pre-steel mixture that includes (i) iron powder; (ii) carbon powder; and (iii) optionally, powder(s) of one or more elements selected from a group including Mn, Ni, Cr, Mo, B, Ti, V, W, Co, Nb, P, S, and Si. This mixture is to include iron powder, carbon powder, and optional powder(s) of one or more selected elements, at weight ratios identical to the weight ratios of these various components in a desired steel product. For example, in order to synthesis a stainless steel type 316 product having, by weight, 12% Ni, 17% Cr, 2.5% Mo, 1% Si, 2% Mn, 0.08% C, 0.045% P, and 0.03 S, the pre-steel mixture, to be combined with powder of a hydride molecule for ball milling, should include powders of each of these elements present in the listed percentages by weight.

Thus, in some implementations, a disclosed process for synthesizing steel nanoparticles includes a step of contacting a steel-AERC, such as one defined by Formulae I or II, with a solvent. In some implementations, the disclosed process for synthesizing steel nanoparticles includes a step of contacting a steel-AERC, such as one defined by Formulae I or II, with a ligand. In some implementations, the disclosed process for synthesizing steel nanoparticles includes a step of contacting a steel-AERC, such as one defined by Formulae I or II, with a solvent and a ligand. Contacting a steel-AERC with a suitable solvent and/or ligand will result in formation of metal nanoparticles 310 having alloy composition dictated by the composition of the steel-AERC, and thus by the composition of the pre-steel mixture from which the steel-AERC was formed.

Non-limiting examples of suitable ligands can include nonionic, cationic, anionic, amphoteric, zwitterionic, and polymeric ligands and combinations thereof. Such ligands typically have a lipophilic moiety that is hydrocarbon based, organosilane based, or fluorocarbon based. Without implying limitation, examples of types of ligands which can be suitable include alkyl sulfates and sulfonates, petroleum and lignin sulfonates, phosphate esters, sulfosuccinate esters, carboxylates, alcohols, ethoxylated alcohols and alkylphenols, fatty acid esters, ethoxylated acids, alkanolamides, ethoxylated amines, amine oxides, nitriles, alkyl amines, quaternary ammonium salts, carboxybetaines, sulfobetaines, or polymeric ligands. In some particular implementations, a ligand can be at least one of a nitrile, an amine, and a carboxylate.

Non-limiting examples of suitable solvents can include any molecular species, or combination of molecular species, capable of interacting with the constituents of an AERC by means of non-bonding or transient-bonding interactions. In different implementations, a suitable solvent for synthesis of metal nanoparticles 310 from a steel-AERC can be a hydrocarbon or aromatic species, including but not limited to: a straight-chain, branched, or cyclic alkyl or alkoxy; or a monocyclic or multicyclic aryl or heteroaryl. In some implementations, the solvent will be a non-coordinating or sterically hindered ether. The term solvent as described can in some variations include a deuterated or tritiated form. In some implementations, a solvent can be an ether, such as THF.

The present invention is further illustrated with respect to the following examples. It needs to be understood that these examples are provided to illustrate specific embodiments of the present invention and should not be construed as limiting the scope of the present invention.

Example 1. Steel Nanoparticle Synthesis

To a ball mill jar is added 0.0136 g carbon, 0.06 g manganese, 7.9264 g iron, and 6.28 g lithium borohydride. This is ball-milled under an inert atmosphere for 4 hours. The steel-AERC product is washed with THF, resulting in formation of steel nanoparticles having a composition 99.08% Fe, 0.17% C, and 0.75% Mn. The formed steel nanoparticles are isolated.

Example 2. Formation of Composite Steel

The steel nanoparticles of Example I are loaded into a punch and die, in the shape of a gear such as a spur gear, with dispersed layers of a weave of carbon fibers. The steel nanoparticle powder is encouraged into the gaps between fibers of the weave of carbon fibers during this loading step. The material is then sintered at about 900° C. and the punch is used to apply about 60 MPa of pressure for 4 hours. The product is machined to finished size and polished. The polished product is a composite steel gear having reinforcing carbon fiber integrated into a steel matrix as illustrated in FIGS. 2A and 2B.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A composite transmission gear, the gear comprising:
a continuous metal matrix formed of sintered metal nanoparticles, the metal nanoparticles comprising metal or metal alloys having a melting temperature greater than about 1500° C. when in the bulk, the continuous metal matrix comprising:
a body portion defining an axis of rotation; and
a tooth portion having gear teeth arrayed around the body portion, the gear teeth configured to engage another gear;
at least one carbon fiber structure fully encapsulated within the continuous metal matrix in at least one of the body portion and the tooth portion.

2. The composite transmission gear as recited in claim 1, the gear defining a transverse plane orthogonal to the axis of rotation and bisecting the body portion, wherein the at least one carbon fiber structure comprises a planar material that is parallel to the transverse plane.

3. The composite transmission gear as recited in claim 2, wherein the planar material is contained within the transverse plane.

4. The composite transmission gear as recited in claim 1, wherein the gear defines a transverse plane orthogonal to the axis of rotation and bisecting the body portion, further wherein the at least one carbon fiber structure comprises a first planar material that is contained within the transverse plane, and a second planar material that is parallel to, and spaced apart from, the transverse plane.

5. The composite transmission gear as recited in claim 1, wherein the at least one carbon fiber structure is fully encapsulated within the continuous metal matrix in both the body portion and the tooth portion.

6. The composite transmission gear as recited in claim 1, wherein the at least one carbon fiber structure is fully encapsulated within the tooth portion.

7. The composite transmission gear as recited in claim 1, wherein the at least one carbon fiber structure is fully encapsulated within a reinforcement region comprising the tooth portion and an outer circumference of the body portion.

8. The composite transmission gear as recited in claim 1, wherein the metal nanoparticles comprise steel nanoparticles.

9. The composite transmission gear as recited in claim 8, wherein the steel nanoparticles comprise an alloy of iron, carbon, and at least one element selected from a group including: Mn, Ni, Cr, Mo, B, Ti, V, W, Co, Nb, P, S, and Si.

* * * * *